(12) United States Patent
Lefebvre et al.

(10) Patent No.: US 10,247,035 B2
(45) Date of Patent: Apr. 2, 2019

(54) SPOKE LOCKING ARCHITECTURE

(71) Applicant: Pratt & Whitney Canada Corp., Longueuil (CA)

(72) Inventors: Guy Lefebvre, St-Bruno-de-Montarville (CA); John Pietrobon, Outremont (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 493 days.

(21) Appl. No.: 15/206,590

(22) Filed: Jul. 11, 2016

(65) Prior Publication Data

US 2017/0107857 A1 Apr. 20, 2017

Related U.S. Application Data

(60) Provisional application No. 62/196,330, filed on Jul. 24, 2015.

(51) Int. Cl.
*F01D 25/16* (2006.01)
*F16B 39/10* (2006.01)

(52) U.S. Cl.
CPC .......... *F01D 25/162* (2013.01); *F16B 39/101* (2013.01); *F16B 39/103* (2013.01); *F05D 2230/60* (2013.01); *F05D 2260/30* (2013.01)

(58) Field of Classification Search
CPC ....... F01D 25/162; F01D 25/28; F01D 25/246
See application file for complete search history.

(56) References Cited

U.S. PATENT DOCUMENTS

| | | | |
|---|---|---|---|
| 3,261,587 A | 7/1966 | Rowley | |
| 3,403,889 A | 10/1968 | Ciokajlo | |
| 3,451,456 A | 6/1969 | Dey | |
| 3,543,588 A | 12/1970 | Richardson | |
| 4,050,494 A | 9/1977 | de Claire | |
| 4,183,207 A | 1/1980 | Libertini | |
| 4,214,851 A | 7/1980 | Tuley et al. | |
| 4,321,007 A | 3/1982 | Dennison et al. | |
| 4,369,016 A | 1/1983 | Dennison | |

(Continued)

FOREIGN PATENT DOCUMENTS

| CN | 103982465 A | 8/2014 |
|---|---|---|
| CN | 203778897 U | 8/2014 |

(Continued)

OTHER PUBLICATIONS

International Search Report for PCT application No. PCT/CA2016/050817 dated Sep. 12, 2016.

(Continued)

*Primary Examiner* — Woody A Lee, Jr.

(74) *Attorney, Agent, or Firm* — Norton Rose Fulbright Canada LLP

(57) ABSTRACT

A spoke locking arrangement comprising a washer seated in a seat defined in a structural ring of a gas turbine engine, the washer having a portion thereof plastically deformed into an anti-rotation notch defined in the structural ring, thereby locking the washer against rotation in the seat, the washer further comprising a set of holes for receiving corresponding bolts, and wherein the washer further has at least one anti-rotation tab at each hole, the anti-rotation tabs being deformable in engagement with the bolts to individually lock the same against rotation.

20 Claims, 4 Drawing Sheets

(56) References Cited

U.S. PATENT DOCUMENTS

| | | |
|---|---|---|
| 4,571,936 A | 2/1986 | Nash et al. |
| 4,735,536 A | 4/1988 | Duran |
| 4,747,738 A | 5/1988 | Duran |
| 4,793,770 A | 12/1988 | Schonewald et al. |
| 4,815,908 A | 3/1989 | Duran et al. |
| 4,820,117 A | 4/1989 | Larrabee et al. |
| 4,836,708 A | 6/1989 | Chambers et al. |
| 4,943,013 A | 7/1990 | Kapala et al. |
| 4,948,316 A | 8/1990 | Duran et al. |
| 4,979,872 A | 12/1990 | Myers et al. |
| 4,987,736 A | 1/1991 | Ciokajlo et al. |
| 5,076,049 A | 12/1991 | Von Benken et al. |
| 5,080,555 A * | 1/1992 | Kempinger .............. F01D 9/065 415/108 |
| 5,160,251 A | 11/1992 | Ciokajlo |
| 5,180,282 A | 1/1993 | Lenhart et al. |
| 5,236,303 A | 8/1993 | Fowler et al. |
| 5,272,869 A | 12/1993 | Dawson et al. |
| 5,292,227 A | 3/1994 | Czachor et al. |
| 5,357,744 A * | 10/1994 | Czachor .................. F01D 9/065 415/134 |
| 5,438,756 A | 8/1995 | Halchak et al. |
| 5,456,719 A | 10/1995 | Keller |
| 5,634,767 A | 6/1997 | Dawson |
| 5,746,574 A | 5/1998 | Czachor et al. |
| 5,941,683 A | 8/1999 | Ridyard et al. |
| 6,250,840 B1 | 6/2001 | Urbach et al. |
| 6,290,442 B1 | 9/2001 | Peterkort |
| 6,358,001 B1 | 3/2002 | Bosel et al. |
| 6,439,616 B1 | 8/2002 | Karafillis et al. |
| 6,439,841 B1 | 8/2002 | Bosel |
| 6,547,518 B1 | 4/2003 | Czachor et al. |
| 6,619,030 B1 | 9/2003 | Seda et al. |
| 6,860,716 B2 | 3/2005 | Czachor et al. |
| 6,883,303 B1 | 4/2005 | Seda |
| 6,889,939 B2 | 5/2005 | Rouyre et al. |
| 7,063,505 B2 | 6/2006 | Czachor |
| 7,195,447 B2 | 3/2007 | Moniz et al. |
| 7,220,119 B1 | 5/2007 | Kirchmer et al. |
| 7,419,121 B2 | 9/2008 | Williams |
| 7,584,621 B2 | 9/2009 | Spitzer et al. |
| 7,594,404 B2 | 9/2009 | Somanath et al. |
| 7,597,537 B2 | 10/2009 | Bucaro et al. |
| 7,610,763 B2 | 11/2009 | Somanath et al. |
| 7,748,209 B1 | 7/2010 | Schopf et al. |
| 7,775,049 B2 | 8/2010 | Kumar et al. |
| 8,001,791 B2 | 8/2011 | Somanath et al. |
| 8,061,969 B2 | 11/2011 | Durocher et al. |
| 8,091,371 B2 | 1/2012 | Durocher et al. |
| 8,099,962 B2 | 1/2012 | Durocher et al. |
| 8,113,768 B2 | 2/2012 | Somanath et al. |
| 8,181,466 B2 | 5/2012 | Kumar et al. |
| 8,215,901 B2 | 7/2012 | Kapustka |
| 8,245,518 B2 | 8/2012 | Durocher et al. |
| 8,347,500 B2 | 1/2013 | Durocher et al. |
| 8,347,635 B2 | 1/2013 | Durocher et al. |
| 8,371,127 B2 | 2/2013 | Durocher et al. |
| 8,371,812 B2 | 2/2013 | Manteiga et al. |
| 8,388,306 B2 | 3/2013 | Somanath et al. |
| 8,500,392 B2 | 8/2013 | Durocher et al. |
| 8,550,773 B2 | 10/2013 | Almstedt et al. |
| 8,578,584 B2 | 11/2013 | Durocher et al. |
| 8,579,583 B2 | 11/2013 | Bock |
| 8,616,835 B2 | 12/2013 | Hashimoto |
| 8,740,550 B2 | 6/2014 | Tanioka |
| 8,827,255 B2 | 9/2014 | Woods |
| 8,863,531 B2 | 10/2014 | Scott et al. |
| 8,876,463 B2 | 11/2014 | Durocher et al. |
| 8,882,384 B2 | 11/2014 | Bynum |
| 8,888,427 B2 | 11/2014 | Ruppert et al. |
| 8,920,109 B2 | 12/2014 | Tham et al. |
| 8,944,749 B2 | 2/2015 | Durocher et al. |
| 8,992,173 B2 | 3/2015 | Farah et al. |
| 9,011,060 B2 | 4/2015 | Hyatt |
| 9,097,138 B2 | 8/2015 | Glahn et al. |
| 9,097,141 B2 | 8/2015 | Paradis |
| 9,140,137 B2 | 9/2015 | Mayer et al. |
| 9,145,908 B2 | 9/2015 | Gill et al. |
| 9,151,316 B2 | 10/2015 | Smith et al. |
| 9,157,325 B2 | 10/2015 | Suciu et al. |
| 9,194,252 B2 | 11/2015 | Farah et al. |
| 9,200,536 B2 | 12/2015 | McCaffrey |
| 9,217,371 B2 | 12/2015 | Farah et al. |
| 9,222,413 B2 | 12/2015 | Farah et al. |
| 9,279,341 B2 | 3/2016 | Durocher et al. |
| 9,303,528 B2 | 4/2016 | Sanchez et al. |
| 9,316,117 B2 | 4/2016 | Sanchez et al. |
| 9,316,153 B2 | 4/2016 | Patat et al. |
| 9,328,629 B2 | 5/2016 | Scott et al. |
| 9,347,374 B2 | 5/2016 | Suciu et al. |
| 9,382,844 B2 | 7/2016 | Muldoon et al. |
| 9,387,905 B2 | 7/2016 | Chonan |
| 9,399,520 B2 | 7/2016 | Cassagne et al. |
| 9,410,596 B2 | 8/2016 | Young et al. |
| 9,447,694 B2 | 9/2016 | Sanchez et al. |
| 9,458,721 B2 | 10/2016 | Palmer |
| 9,476,443 B2 | 10/2016 | Stoner |
| 9,482,115 B2 | 11/2016 | Harris et al. |
| 2007/0196196 A1 | 8/2007 | Schorling et al. |
| 2010/0132370 A1* | 6/2010 | Durocher .............. F01D 25/162 60/796 |
| 2010/0132371 A1 | 6/2010 | Durocher et al. |
| 2010/0132372 A1 | 6/2010 | Durocher et al. |
| 2010/0132376 A1* | 6/2010 | Durocher .............. F01D 9/065 60/797 |
| 2010/0275572 A1 | 11/2010 | Durocher et al. |
| 2010/0303610 A1 | 12/2010 | Wang et al. |
| 2012/0227371 A1 | 9/2012 | Johnson et al. |
| 2013/0052006 A1 | 2/2013 | Petty |
| 2013/0064647 A1 | 3/2013 | Hashimoto |
| 2013/0094951 A1* | 4/2013 | McCaffrey ............ F01D 25/162 415/200 |
| 2013/0192238 A1 | 8/2013 | Munsell et al. |
| 2013/0192256 A1 | 8/2013 | Suciu et al. |
| 2013/0192267 A1 | 8/2013 | Sanchez et al. |
| 2013/0195624 A1 | 8/2013 | Schwarz et al. |
| 2014/0003920 A1 | 1/2014 | Scott |
| 2014/0007588 A1 | 1/2014 | Sanchez et al. |
| 2014/0013770 A1* | 1/2014 | Farah ...................... F01D 25/16 60/796 |
| 2014/0013771 A1 | 1/2014 | Farah et al. |
| 2014/0102110 A1 | 4/2014 | Farah et al. |
| 2014/0137534 A1 | 5/2014 | Sanchez et al. |
| 2014/0205447 A1 | 7/2014 | Patat et al. |
| 2014/0227078 A1 | 8/2014 | Chokshi |
| 2014/0255174 A1 | 9/2014 | Duelm et al. |
| 2015/0044032 A1 | 2/2015 | Paradis et al. |
| 2015/0064000 A1* | 3/2015 | Yagi ...................... F01D 25/162 415/209.3 |
| 2015/0125291 A1 | 5/2015 | Chokshi |
| 2015/0192034 A1 | 7/2015 | Bedard et al. |
| 2015/0192165 A1 | 7/2015 | Bauer et al. |
| 2015/0192167 A1 | 7/2015 | Harris et al. |
| 2015/0233295 A1 | 8/2015 | Farah et al. |
| 2015/0260057 A1 | 9/2015 | Farah et al. |
| 2015/0337681 A1 | 11/2015 | Scott et al. |
| 2015/0338005 A1 | 11/2015 | Davis et al. |
| 2015/0345337 A1 | 12/2015 | Petty et al. |
| 2015/0345338 A1 | 12/2015 | Yeager et al. |
| 2015/0354411 A1 | 12/2015 | Scott |
| 2016/0017754 A1 | 1/2016 | Kumar |
| 2016/0017807 A1* | 1/2016 | Chuong ................ F01D 25/30 415/213.1 |
| 2016/0024949 A1 | 1/2016 | Wilber |
| 2016/0032775 A1 | 2/2016 | Wang et al. |
| 2016/0107276 A1 | 4/2016 | Gekht et al. |
| 2016/0146101 A1 | 5/2016 | Lee |
| 2016/0153315 A1 | 6/2016 | Kapustka et al. |
| 2016/0169050 A1 | 6/2016 | Scott et al. |
| 2016/0186614 A1 | 6/2016 | Paulino |
| 2016/0201512 A1 | 7/2016 | Bauer et al. |
| 2016/0201516 A1 | 7/2016 | Bauer et al. |
| 2016/0208644 A1 | 7/2016 | Burdick et al. |
| 2016/0208646 A1 | 7/2016 | Winn et al. |

(56) References Cited

U.S. PATENT DOCUMENTS

| | | |
|---|---|---|
| 2016/0208647 A1 | 7/2016 | Cherolis et al. |
| 2016/0208648 A1 | 7/2016 | Farah |
| 2016/0208655 A1 | 7/2016 | Farah et al. |
| 2016/0208699 A1 | 7/2016 | Cherolis et al. |
| 2016/0208701 A1 | 7/2016 | Cherolis et al. |
| 2016/0222827 A1 | 8/2016 | Winn et al. |
| 2016/0230598 A1 | 8/2016 | Cherolis et al. |
| 2016/0230602 A1 | 8/2016 | Broulidakis et al. |
| 2016/0230603 A1 | 8/2016 | Broulidakis et al. |
| 2016/0245105 A1 | 8/2016 | Farah et al. |
| 2016/0245114 A1 | 8/2016 | Wang |
| 2016/0265439 A1 | 9/2016 | Winn et al. |
| 2016/0273383 A1 | 9/2016 | Cherolis et al. |
| 2016/0273384 A1 | 9/2016 | Winn et al. |
| 2016/0290166 A1 | 10/2016 | Max et al. |
| 2016/0290167 A1 | 10/2016 | Porter et al. |
| 2016/0312659 A1 | 10/2016 | Lienau et al. |
| 2016/0326910 A1 | 11/2016 | Socha et al. |
| 2016/0333739 A1 | 11/2016 | Vo et al. |

FOREIGN PATENT DOCUMENTS

| | | |
|---|---|---|
| CN | 105805143 A | 7/2016 |
| DE | 3233976 C1 | 8/1983 |
| EP | 1936210 A1 | 6/2008 |
| EP | 2192271 B1 | 9/2014 |
| EP | 2192273 B1 | 9/2014 |
| FR | 2786230 A1 | 5/2000 |
| GB | 898164 A | 6/1962 |
| GB | 913407 A | 12/1962 |
| GB | 1193056 A | 5/1970 |
| GB | 1361994 A | 7/1974 |
| GB | 1411299 A | 10/1975 |
| GB | 2196083 A | 4/1988 |
| KR | 1216286 B1 | 12/2012 |
| KR | 1558493 B1 | 10/2015 |
| WO | WO2011135199 A1 | 11/2011 |
| WO | WO2014/105572 | 7/2014 |
| WO | WO2014113034 A1 | 7/2014 |
| WO | WO2014115187 A1 | 7/2014 |
| WO | WO2014137574 A1 | 9/2014 |
| WO | WO2015156882 A2 | 10/2015 |
| WO | WO2015157751 A1 | 10/2015 |

OTHER PUBLICATIONS

International Search Report for PCT application No. PCT/CA2016/050818 dated Aug. 25, 2016.
International Search Report for PCT application No. PCT/CA2016/050825 dated Sep. 19, 2016.
International Search Report for PCT application No. PCT/CA2016/050824 dated Sep. 28, 2016.

* cited by examiner

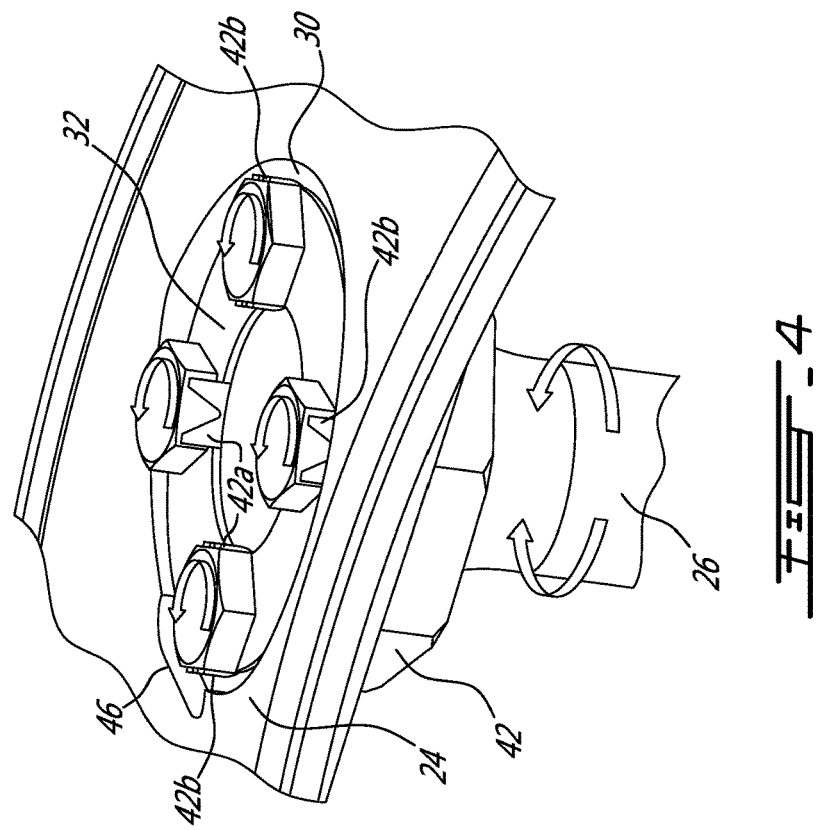
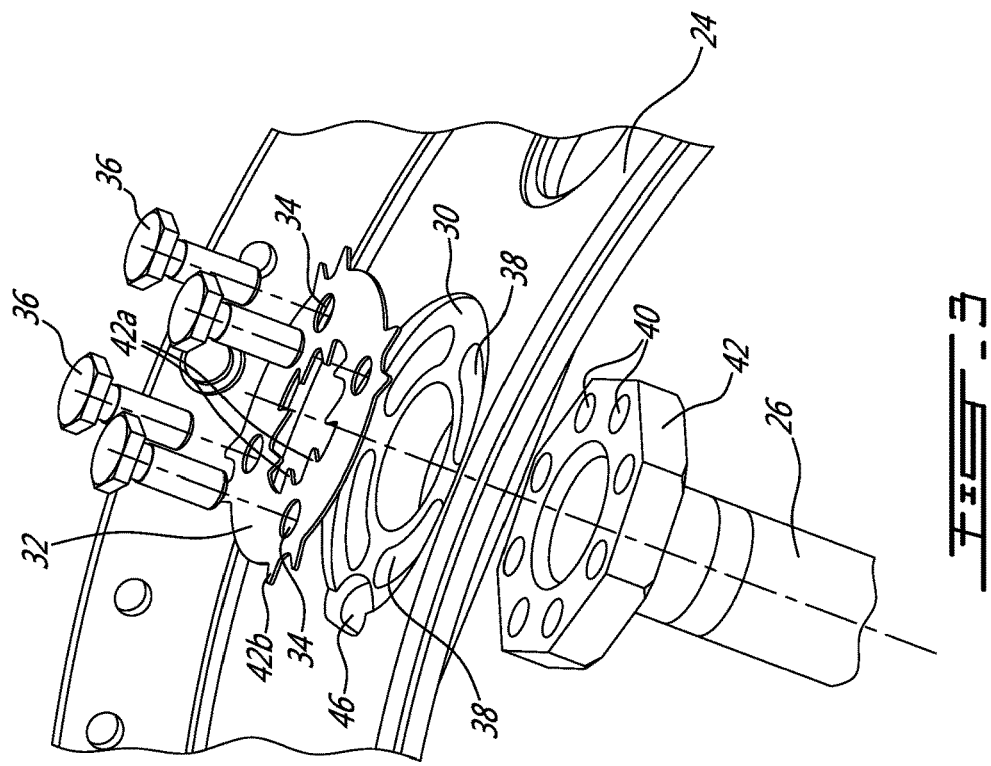

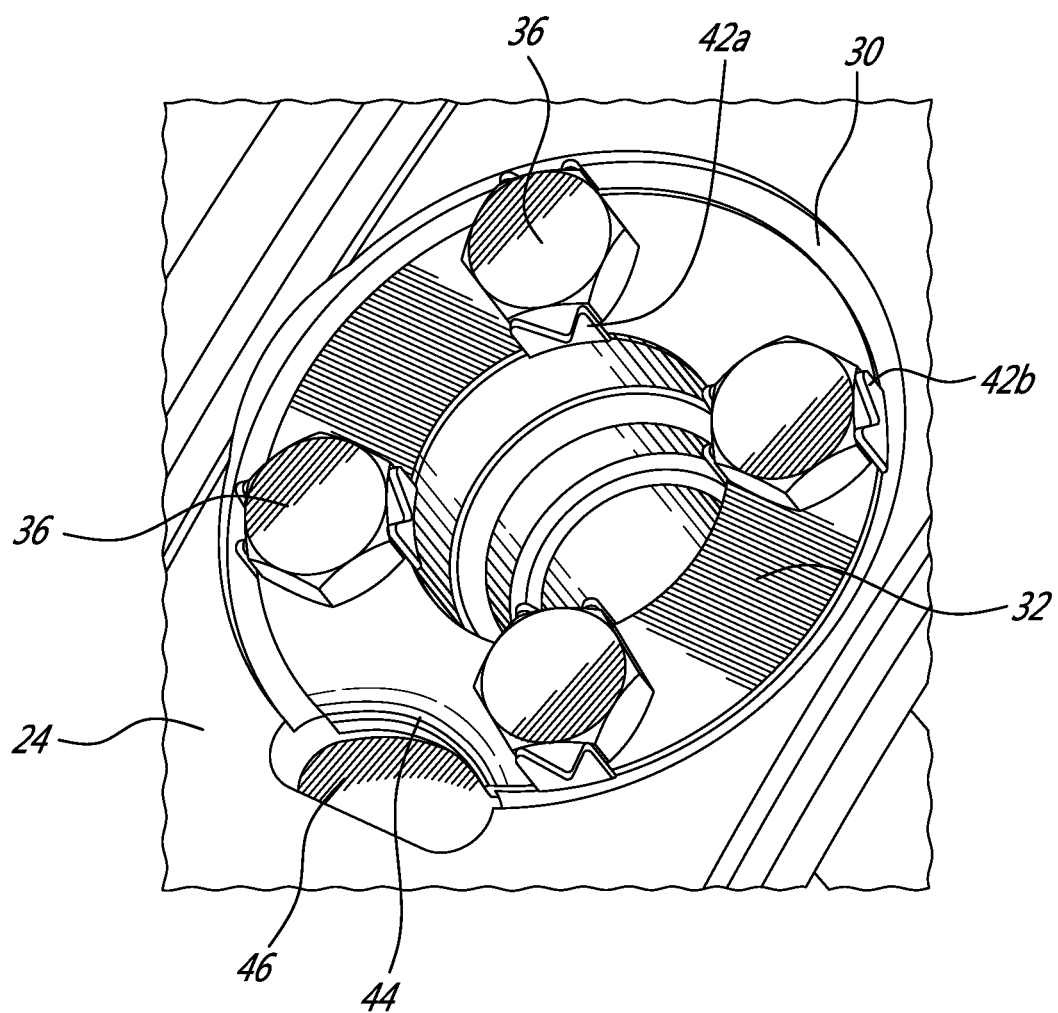
FIG_5

SPOKE LOCKING ARCHITECTURE

REFERENCE TO RELATED APPLICATION

The application claims priority of U.S. Provisional Application No. 62/196,330 filed on Jul. 24, 2015, the content of which is hereby incorporated by reference.

TECHNICAL FIELD

The application relates generally to gas turbine engines and, more particularly, to a spoke locking architecture.

BACKGROUND OF THE ART

It is known to use structural spokes to mount a bearing casing to an outer structural ring of a gas turbine engine. For instance, such spokes may be found in mid-turbine frame modules. Each spoke typically extends radially from the outer ring through a strut in the gaspath to an inner ring supporting the bearing casing.

Conventional locking features to ensure the integrity and prevent loosening of the connection between the spokes and the inner or outer structural ring are typically composed of several individual pieces and require sufficient radial clearance for installation.

SUMMARY

In one aspect, there is provided a spoke locking arrangement comprising: a structural spoke mounted to a first surface of a structural part of a gas turbine engine, a washer seated in a seat defined in a second surface of the structural part opposite to the first surface thereof, the washer having a portion thereof plastically deformed in an anti-rotation notch defined in the structural part, the washer further having a set of holes in registry with corresponding mounting slots defined in the seat, bolts extending through said holes and said mounting slots for threaded engagement with the structural spoke, and a set of anti-rotation tabs on said washer individually locking the bolts against rotation.

According to another aspect, there is provided a gas turbine engine comprising a plurality of structural spokes supporting a bearing housing within a structural case, each structural spoke being mounted to a first surface of the structural case, a washer seated in a seat defined in a second surface of the structural case opposite to the first surface thereof, the washer having a portion thereof plastically deformed in an anti-rotation notch defined in the structural case, the washer further having a set of holes in registry with corresponding mounting slots defined in the seat, fasteners extending through said holes and said mounting slots for threaded engagement with the structural spoke, and a set of anti-rotation tabs on said washer individually locking the fasteners against rotation.

According to another aspect, there is provided a spoke locking arrangement comprising: a washer seated in a seat defined in an outer circumferential surface of the outer structural ring, the washer having a set of holes in registry with corresponding mounting slots extending through the seat, bolts extending through said holes and said mounting slots for threaded engagement with each of the structural spokes, the bolts being individually locked against rotation by locking tabs provided on the washer, and the structural spokes being locked against rotation relative to the outer structural ring by the engagement of a portion of the washer in an anti-rotation notch defined in the outer structural ring.

According to a still further aspect, there is provided a method of rotatably locking multiple bolts and a spoke, the method comprising: positioning a washer on a first side of a structural part, inserting bolts from said first side through registering holes in the washer and the structural part, threadably engaging the bolts with a structural spoke positioned on a second side of the structural part, the second side being opposite to the first side, tightening the bolts to a predetermined torque, locking the bolts against rotation by bending anti-rotation tabs formed in the washer in engagement with a head of each of the bolts, and locking the washer against rotation relative to the structural part by plastically deforming a portion of the washer in an anti-rotation notch defined in the structural part.

DESCRIPTION OF THE DRAWINGS

Reference is now made to the accompanying figures in which:

FIG. 3 is an exploded isometric view illustrating the bolted connection between the spoke and the outer structural ring;

FIG. 4 is an isometric view illustrating the anti-rotation features of the bolted connection shown in FIG. 3; and FIG. 5 is a top isometric view illustrating how the washer of the bolted connection is deformed into an anti-rotation catch defined in the outer structural ring.

DETAILED DESCRIPTION

Figure 1:
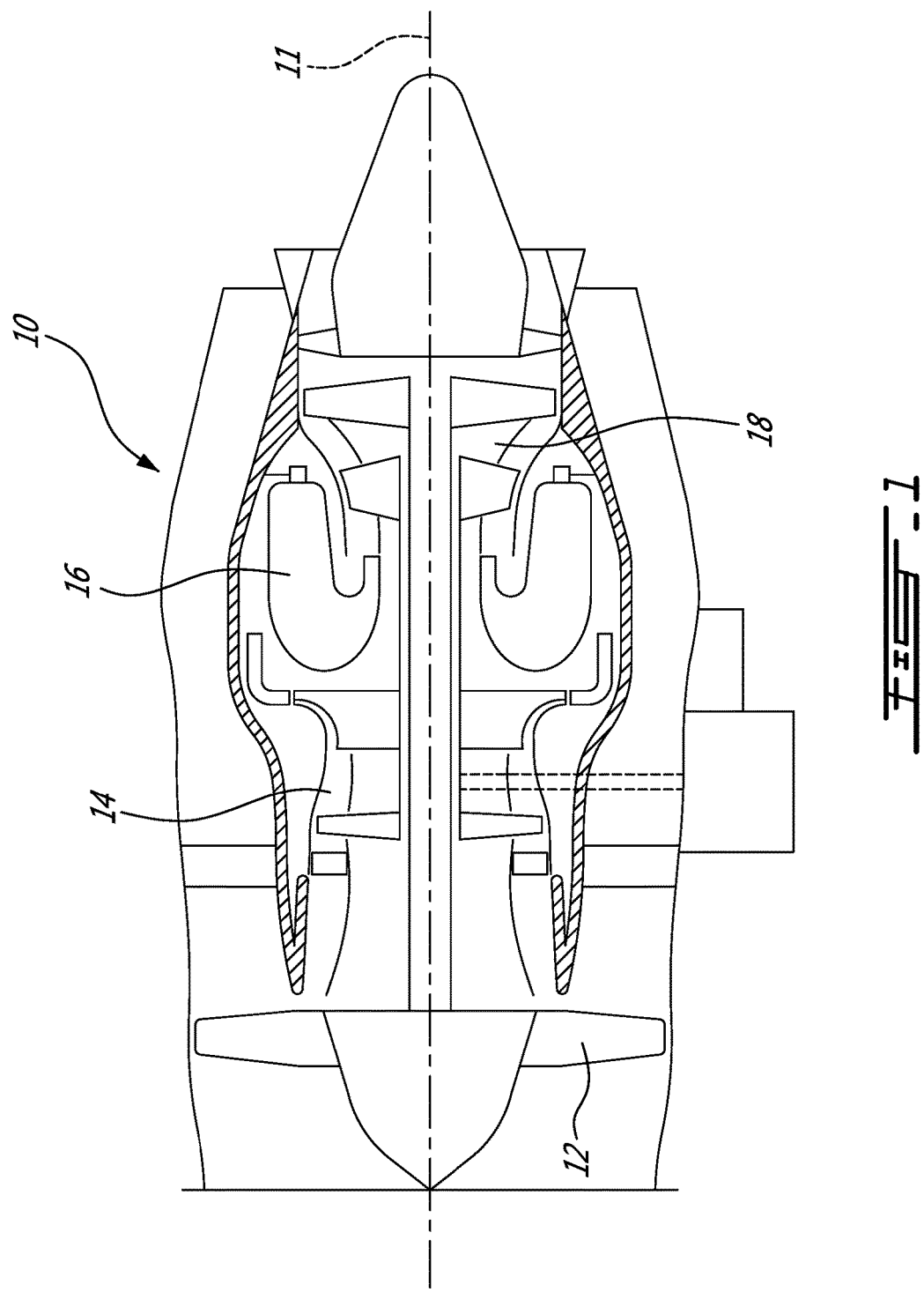
FIG. 1 is a schematic cross-section view of a gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
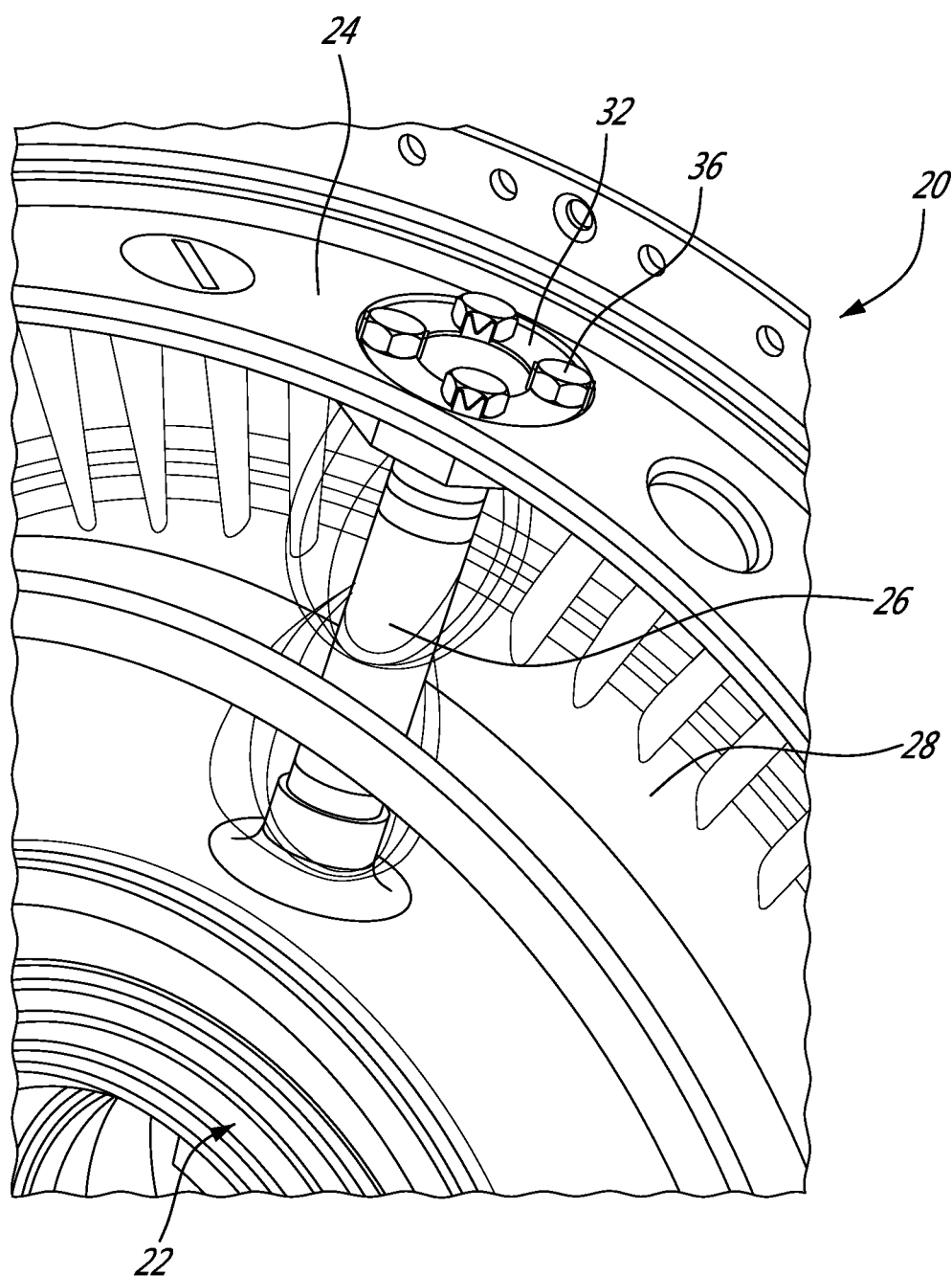
FIG. 2 is an enlarged isometric view of a portion of a mid-turbine frame module and illustrating mounting details between a spoke and an outer structural ring.

FIG. 2 shows a portion of the turbine section 18. More particularly, FIG. 2 illustrates a mid-turbine frame module 20. The mid-turbine frame module 20 comprises an inner structural ring 22 adapted to receive and support a bearing casing (not shown) which is, in turn, adapted to support the main shafts of the engine 10. The inner structural ring 22 is structurally supported by an outer structural ring 24 by means of a plurality of circumferentially distributed spokes (e.g. 6), only one of which is show at 26 in FIG. 2. Each spoke 26 may extend radially through a hollow strut of a non-structural integrated strut-vane casing 28 "floatingly" mounted between the inner and outer structural rings 22 and 24 for guiding the combustion gases between two axially adjacent turbine stages.

As best shown in FIGS. 3 and 4, each spoke 26 is bolted at its radially outer end to the outer structural ring 24. At each point of assembly, a seat 30 is defined in the radially outer surface of the outer ring 24 for receiving a washer 32 in a recessed fashion. The washer 32 may have a flat body with circumferentially spaced-apart holes 34 define therein for individually receiving respective bolts 36 (4 in the illustrated example). Corresponding elongated mounting slots 38 are defined in the bottom of the seat 30 for receiving the bolts 36. Each slot 38 permits alignment with at least one corresponding threaded hole 40 of an annular array of holes defined in a mounting flange or head 42 at the radially outer end of the spoke 26. Accordingly, the washer 32 is positioned in its associated seat 30 so that the holes 34 defined therein are in alignment or registry with the corresponding holes 40 of the mounting flange of the spoke 26. After the holes 34 in the washer 32 have been appropriately angularly aligned with the corresponding holes 40 in the mounting flange of the spoke 26, the bolts 36 are tighten to firmly join the spoke 26 to the outer structural ring 24.

As shown in FIGS. 3 and 4, the washer 32 is provided at each hole 34 with a pair of anti-rotation tabs 42. According to the illustrated embodiment, each pair of anti-rotation tabs 42 comprises a first tab 42a on the inner diameter of the washer 32 and an opposed facing second tab 42b on the outer diameter of the washer 32. As shown in FIG. 4, each pair of first and second tabs 42a, 42b may be bent out of the plane of the washer into engagement with the head of the associated bolt 36 to positively lock the same against rotation. In the illustrated embodiment, each pair of anti-rotation tabs 42 is engageable with opposed sides of a hexagonal head of the associated bolt 36. This effectively prevents loosening of the bolts 36. While deformable or bendable tabs have been shown, it is understood that any suitable types of locking tabs could be used as well.

Referring to FIG. 5, it can be seen that a peripheral portion 44 of the washer may be deformed into an anti-rotation notch or cavity 46 provided at one location around the perimeter of the washer seat 30. According to one embodiment, the peripheral portion 44 of the washer 32 could be punched into the anti-rotation cavity 46 after all the bolts 36 have been tighten and locked in position with the tabs 42. This prevents rotational movement of the washer 32 relative to the outer casing 24, thereby locking the spoke 26 against rotation about its longitudinal axis.

The washer 32 with its multiple locking tabs 42 provides anti-rotation to all the bolts 36 and to the spoke 26. In other words, the above described locking mechanism accomplished two functions: 1) it locks in place the structural spoke used to connect the inner ring and associated bearing casing to the outer structural ring and 2) it secures the bolts required to maintain the spoke in firm engagement with the outer structural ring. A single locking mechanism provides anti-rotation to multiple engine components having different axes of rotation (it provides anti-rotation about 5 different axes according to the illustrated embodiment).

The washer 32 with its anti-rotation tabs 42 for a plurality of bolts requires minimal clearance. It also contributes reducing the impact on engine cost and weight. It provides a simple anti-rotation mechanism with one locking feature for multiple components (5 in the illustrated embodiment—1 spoke and 4 bolts). This contributes to reduce assembly time and minimize the possibility of error.

The above description is meant to be exemplary only, and one skilled in the art will recognize that changes may be made to the embodiments described without departing from the scope of the invention disclosed. For example, a similar anti-rotation arrangement could be used to bolt the inner end of the spoke to the inner ring. Also, the anti-rotation catch or cavity could take various forms. While a pair of anti-rotation tabs has been shown and described per hole, it is understood that the number and location of tabs at each hole could vary. Also, various elements of the spoke locking architecture could be used at various locations in the engine and is thus not limited to the mounting of spokes to the outer ring of a mid-turbine frame. Indeed, the spokes could be mounted to other structural parts of the engine. Still other modifications which fall within the scope of the present invention will be apparent to those skilled in the art, in light of a review of this disclosure, and such modifications are intended to fall within the appended claims.

The invention claimed is:

1. A gas turbine engine comprising a plurality of structural spokes supporting a bearing housing within a structural case, each structural spoke being mounted to a first surface of the structural case, a washer seated in a seat defined in a second surface of the structural case opposite to the first surface thereof, the washer having a portion thereof plastically deformed in an anti-rotation notch defined in the structural case, the washer further having a set of holes in registry with corresponding mounting slots defined in the seat, fasteners extending through said holes and said mounting slots for threaded engagement with the structural spoke, and a set of anti-rotation tabs on said washer individually locking the fasteners against rotation.

2. The engine defined in claim 1, wherein the anti-rotation notch is defined at a periphery of the seat, and wherein the portion of the washer which is plastically deformed in the anti-rotation notch is at an outer diameter of the washer.

3. The engine defined in claim 1, wherein said anti-rotation tabs comprise a pair of anti-rotation tabs adjacent each of the holes defined in the washer, each pair of anti-rotation tabs comprising a first tab on an inner diameter of the washer and a second opposed facing tab on an outer diameter of the washer.

4. The engine defined in claim 3, wherein the anti-rotation tabs are bendable into engagement with a head of an associated one of the fasteners.

5. The engine defined in claim 1, wherein the anti-rotation tabs are bendable out of the plane of the washer for engagement with a head of the fasteners.

6. The engine defined in claim 5, wherein the seat is sized to receive the washer while the anti-rotation tabs are still lying in the plane of the washer.

7. The engine defined in claim 1, wherein the structural case is an outer structural ring of a mid-turbine frame module, and wherein the seat is defined in a radially outer circumferential surface of the outer structural ring.

8. The engine defined in claim 7, wherein the seat is recessed into the radially outer circumferential surface of the outer structural ring.

9. The engine defined in claim 1, wherein the structural spoke has a head and a shank, the shank extending along a central axis, and wherein the fasteners are threadably engaged with the head around the central axis.

10. The engine defined in claim 1, wherein the portion of the washer is punched into the anti-rotation notch.

11. In a gas turbine engine having a plurality of structural spokes structurally linking an inner structural ring to an outer structural ring; a spoke locking arrangement comprising: a washer seated in a seat defined in an outer circumferential surface of the outer structural ring, the washer having a set of holes in registry with corresponding mounting slots extending through the seat, bolts extending through said holes and said mounting slots for threaded engagement with each of the structural spokes, the bolts being individually locked against rotation by locking tabs provided on the washer, and the structural spokes being locked against rotation relative to the outer structural ring by the engagement of a portion of the washer in an anti-rotation notch defined in the outer structural ring.

12. The spoke locking arrangement defined in claim 11, wherein the portion of the washer is punched into the anti-rotation notch.

13. The spoke locking arrangement defined in claim 11, wherein the portion of the washer is plastically deformed in the anti-rotation notch.

14. The spoke locking arrangement defined in claim 11, wherein the anti-rotation notch is provided at a periphery of the seat, and wherein the portion of the washer is located at one location around an outer diameter of the anti-rotation notch.

15. The spoke locking arrangement defined in claim 11, wherein said anti-rotation tabs comprise a pair of anti-rotation tabs at each of the holes defined in the washer, each pair of anti-rotation tabs comprising a first tab projecting from an inner diameter of the washer and a second opposed facing tab projecting from an outer diameter of the washer.

16. The spoke locking arrangement defined in claim 11, wherein the anti-rotation tabs are bendable into engagement with a head of an associated one of the bolts.

17. The spoke locking arrangement defined in claim 11, wherein the anti-rotation tabs are bendable out of the plane of the washer for engagement with respective heads of the bolts.

18. A method of rotatably locking multiple bolts and a spoke, the method comprising: positioning a washer on a first side of a structural part, inserting bolts from said first side through registering holes in the washer and the structural part, threadably engaging the bolts with a structural spoke positioned on a second side of the structural part, the second side being opposite to the first side, tightening the bolts to a predetermined torque, locking the bolts against rotation by bending anti-rotation tabs formed in the washer in engagement with a head of each of the bolts, and locking the washer against rotation relative to the structural part by plastically deforming a portion of the washer in an anti-rotation notch defined in the structural part.

19. The method of claim 18, wherein plastically deforming comprises punching the washer into the locking notch.

20. The method of claim 18, wherein locking the bolts comprises trapping the head of each bolt between first and second anti-rotation tabs.

* * * * *